US010565036B1

(12) United States Patent
Wang et al.

(10) Patent No.: US 10,565,036 B1
(45) Date of Patent: Feb. 18, 2020

(54) METHOD OF SYNCHRONIZING HOST AND COPROCESSOR OPERATIONS VIA FIFO COMMUNICATION (71) Applicant: Axis Semiconductor, Inc., Metheun, MA (US)

(72) Inventors: Xiaolin Wang, Metheun, MA (US); Qian Wu, Redwood City, CA (US)

(73) Assignee: Axis Semiconductor, Inc., Metheun, MA (US)

( * ) Notice: Subject to any disclaimer, the term of this patent is extended or adjusted under 35 U.S.C. 154(b) by 0 days.

(21) Appl. No.: 16/275,917

(22) Filed: Feb. 14, 2019

(51) Int. Cl.
*G06F 3/00* (2006.01)
*G06F 9/54* (2006.01)
*G06F 13/16* (2006.01)
*G06F 13/42* (2006.01)

(52) U.S. Cl.
CPC .......... *G06F 9/542* (2013.01); *G06F 13/1668* (2013.01); *G06F 13/4247* (2013.01)

(58) Field of Classification Search
CPC .................................................. G06F 9/542
USPC ........................................................ 719/310
See application file for complete search history.

(56) References Cited

U.S. PATENT DOCUMENTS

| 5,212,777 | A | 5/1993 | Gove et al. |
| 5,226,125 | A | 7/1993 | Balmer et al. |
| 5,239,654 | A | 8/1993 | Ing-Simmons et al. |
| 5,471,592 | A | 11/1995 | Gove et al. |
| 5,471,626 | A | 11/1995 | Carnevale |
| 5,594,679 | A | 1/1997 | Iwata |
| 5,706,459 | A | 1/1998 | Atsushi |
| 5,721,835 | A * | 2/1998 | Niwa .................... G06F 1/1632 710/303 |
| 5,784,636 | A | 7/1998 | Rupp |

(Continued)

FOREIGN PATENT DOCUMENTS

| EP | 0284364 A3 | 9/1988 |
| EP | 0569312 A2 | 11/1993 |

(Continued)

OTHER PUBLICATIONS

Mr. Sanjay Sharma, Design and Implementation of First in First Out Memory. (Year: 2006).*

(Continued)

*Primary Examiner* — Lechi Truong
(74) *Attorney, Agent, or Firm* — Maine Cernota & Rardin (57) ABSTRACT

A method of synchronizing thread execution of a host and one or more coprocessors includes writing by the host of an event command and at least one coprocessor instruction to a FIFO and comparing of the event command with a current event register of the coprocessor until they match, whereupon the FIFO entries are popped and the instructions are forwarded to the coprocessor for execution. A plurality of entry groups can be written to the FIFO, each beginning with an event command. The instructions can direct the coprocessor to exchange data with shared memory and apply its thread to the received data. The processors and shared memory can be linked by a ring-type bus having a controller that performs the comparison, popping, and instruction forwarding. The coprocessor clears the current event register during thread execution, and then writes an event command to the register when processing is complete.

17 Claims, 8 Drawing Sheets

(56) References Cited

U.S. PATENT DOCUMENTS

| | | |
|---|---|---|
| 5,887,160 A | 3/1999 | Lauritzen |
| 5,937,203 A | 8/1999 | Lee |
| 5,996,083 A | 11/1999 | Gupta et al. |
| 6,023,753 A | 2/2000 | Pechanek et al. |
| 6,052,773 A | 4/2000 | Dehon |
| 6,070,003 A | 5/2000 | Gove et al. |
| 6,151,668 A | 11/2000 | Pechanek et al. |
| 6,173,389 B1 | 1/2001 | Pechanek et al. |
| 6,216,223 B1 | 4/2001 | Revilla et al. |
| 6,219,785 B1 | 4/2001 | Smith |
| 6,321,322 B1 | 11/2001 | Pechanek et al. |
| 6,446,191 B1 | 9/2002 | Pechanek et al. |
| 6,467,036 B1 | 10/2002 | Pechanek et al. |
| 6,539,438 B1 | 3/2003 | Ledzius et al. |
| 6,574,764 B2 | 6/2003 | Krech, Jr. |
| 6,704,857 B2 | 3/2004 | Barry et al. |
| 6,851,041 B2 | 2/2005 | Pechanek et al. |
| 6,859,873 B2 | 2/2005 | Norden |
| 6,883,088 B1 | 4/2005 | Barry et al. |
| 6,954,281 B2 | 10/2005 | Fukuda et al. |
| 7,036,036 B2 | 4/2006 | Vorbach et al. |
| 7,143,302 B2 | 11/2006 | Pappalardo et al. |
| 7,200,287 B2 | 4/2007 | Fukuda et al. |
| 7,205,864 B2 | 4/2007 | Schultz, Jr. et al. |
| 7,260,707 B2 | 8/2007 | Norden |
| 7,395,411 B2 | 7/2008 | Kasahara |
| 7,406,588 B2 | 7/2008 | Lin |
| 7,454,598 B2 | 11/2008 | Hastie |
| 7,519,797 B1 | 4/2009 | Stiehl et al. |
| 7,653,805 B2 | 1/2010 | Yoshikawa et al. |
| 2001/0012127 A1 | 8/2001 | Fukuda et al. |
| 2001/0021278 A1 | 9/2001 | Fukuda et al. |
| 2002/0162046 A1 | 10/2002 | Krech, Jr. |
| 2002/0199085 A1 | 12/2002 | Norden |
| 2003/0043848 A1 | 3/2003 | Sonksen |
| 2003/0061473 A1 | 3/2003 | Revilla et al. |
| 2003/0079109 A1 | 4/2003 | Pechanek et al. |
| 2003/0088757 A1 | 5/2003 | Lindner |
| 2003/0200420 A1 | 10/2003 | Pechanek et al. |
| 2004/0019765 A1 | 1/2004 | Klein, Jr. |
| 2004/0078548 A1 | 4/2004 | Claydon |
| 2005/0021578 A1 | 1/2005 | Chen |
| 2005/0076187 A1 | 4/2005 | Claydon |
| 2005/0149699 A1 | 7/2005 | Norden |
| 2006/0028683 A1 | 2/2006 | Fukuda et al. |
| 2006/0253689 A1 | 11/2006 | Knowles |
| 2006/0259741 A1 | 11/2006 | Hastie |
| 2006/0259742 A1 | 11/2006 | Norden |
| 2006/0259748 A1 | 11/2006 | Lin |
| 2007/0143577 A1 | 6/2007 | Smith |
| 2008/0301413 A1 | 12/2008 | Wang |
| 2015/0235055 A1* | 8/2015 | An ............ G06F 21/74 713/186 |

FOREIGN PATENT DOCUMENTS

| | | |
|---|---|---|
| EP | 1199629 A1 | 4/2002 |
| EP | 1780644 A1 | 5/2007 |
| WO | 199744728 A1 | 11/1997 |
| WO | 20030088071 A2 | 10/2003 |

OTHER PUBLICATIONS

Anirban Basu: "A Transputer Based Adaptable Pipeline" Internationl Conference on Supercomputing, Conferenceproceedings. ACM, New York, US vol. 1, May 4, 1987.

Barat F et al, Reconfigurable instructin set processors from a hardware/software perspective, IEEE Transactions on Software Engineering, IEE Service Center, vol. 28, No. 9, Sep. 1, 2002, 16 pages.

Chen D C et al, A Reconfigurable Multiprocessor IC for Rapid Prototyping of Algorithmic-Specfiic High-Sped DSP Data Paths, IEEE Journal of Soldid-State Circuits, IEE Service Center, vol. 27, No. 12, Dec. 1, 1992, 10 pages.

Hans M Jacobson et al, Application-Specific Programmable Control for High-Performance Asynchronous Circuits, Proceedings of the IEEE, IEEE. NY, NY vol. 87, No. 2, Feb. 1, 1999, 13 pages.

Michael Taylor et. al., The Raw Processor: A Composeable 32-Bit Fabric for Embedded and General Purpose Computing, MIT Laboratory for Computer Science, Proceedings of Hotchips 13, Aug. 2001, 4 pages.

Schmit H H et al: "Pipeline Reconfigurable FPGAS" Journal of VLSI Signal Processing Systems for Signal, Image, and Video Technology, Springer, New York, NY US LNKD-DOI: 10.1023/A: 1008137204598, vol. 24, No. 2/03, Mar. 1, 2000, pp. 12-145, XP000908461 ISSN:0922-5773 the whole document.

European Examination Report for Appl. No. 09754166.8, dated Aug. 19, 2011, 5 pgs.

European Examination Report for Appl. No. 09754167.6, dated Aug. 25, 2011, 5 pgs.

PCT Search Report dated Aug. 25, 2010 of Patent Application No. PCT/IB2009/000135 filed Jan. 26, 2009.

PCT Search Report for PCT Application No. PCT/IB2009/000131, dated Jun. 23, 2009, 4 pages.

PCT Search Report for PCT Application No. PCT/IB2009/000135, dated Aug. 25, 2010, 9 pages.

U.S. Pat. No. Re. 41,703; Pechanek et al, Sep. 14, 2010, 29 pages.

* cited by examiner

METHOD OF SYNCHRONIZING HOST AND COPROCESSOR OPERATIONS VIA FIFO COMMUNICATION

FIELD OF THE INVENTION

The invention relates to multi-thread program execution, and more particularly, to methods for synchronizing the actions of a host and at least one coprocessor during multi-thread program execution.

BACKGROUND OF THE INVENTION

As the availability of multi-core and other multiple processor computing devices has continued to rise, and the cost thereof has continued to fall, multi-thread processing has become an increasingly effective approach to optimizing the speed and efficiency with which computing devices are able to process data, especially for applications such as image processing and voice encoding, wherein a specified algorithm is applied repeatedly to a large number of data frames or "batches" in a fixed timing order, with little or no interdependence between the processing of the separate data frames.

In many cases, the functions performed by a given application can be divided into "host" or "control" functions that have an unknown timing order and may have interactive inputs, and one or more "helper" functions that do not have any interactive inputs, and for which the input order is strictly defined. An example would be a computer game, where some functions have an unknown timing order and may have interactive inputs, such as functions that are directly associated with user interaction, while other functions are directed to performing certain background tasks associated with the game, such as image processing or voice encoding, that accept and process data frames in a defined order without user interaction. Another example would be a voice-enabled application running on a smart appliance or a mobile device such as a cellular telephone.

In such cases, multi-thread processing can be implemented by assigning the function(s) that perform operations with an unknown timing, including those that support user interaction, to a "host" or "control" thread, while at least some of the helper functions are assigned to one or more "helper" threads. Often, when coprocessors are available, the control functions are executed on a host processor, while some or all of the helper threads are offloaded to one or more coprocessors.

While this multi-thread, host/coprocessor approach can be very powerful, successful implementation requires a robust and efficient method of synchronizing and coordinating the program executions performed by the host processor and the coprocessors.

One approach is to use hardware interrupts to synchronize the actions of the host processor and coprocessors. However, this approach is "costly" in terms of hardware utilization, and may be limited if the hardware platform does not provide sufficient interrupts with suitable functionality.

Another approach is to use a "message passing interface" ("MPI") protocol implemented in shared memory. However, this approach is costly in terms of execution time.

What is needed, therefore, is an efficient method of synchronizing and coordinating the program executions of a host processor and one or more coprocessors without dependence on interrupts, and while avoiding the execution speed penalty of an MPI implementation.

SUMMARY OF THE INVENTION

The present invention is a method of synchronizing and coordinating the program executions of a host processor and one or more coprocessors without dependence on interrupts, and while avoiding the execution speed penalty of an MPI implementation. The invention achieves these goals by implementing at least one FIFO (first in first out memory) that can store "event" commands as well as coprocessor instructions such as data flow and synchronization instructions, According to the disclosed method, the host processor writes a series of entries to the FIFO that begins with an event command stored in the "head" of the FIFO. In embodiments, the entries can comprise a plurality of entry groups, each of which includes an event command followed by an associated group of coprocessor instructions.

In some embodiments that include a plurality of coprocessors, a FIFO is dedicated to each of the coprocessors. In addition, each of the coprocessors maintains a "current event" register where the coprocessor stores an event command when it is ready to receive new input.

According to the disclosed method, during program operation the head entries of the FIFOs and the current event registers of the associated coprocessors are compared with each other on a continuous or pseudo-continuous basis. When the event command stored in the current event register of a coprocessor is found to be equal to, or otherwise "agrees with" the event command stored as the head entry of its associated FIFO, the coprocessor instructions that immediately follow the event command in the FIFO are sequentially "popped" from the FIFO until the next event command is encountered, or until the last entry written to the FIFO has been popped. In embodiments, the FIFO entries are cleared as they are popped from the FIFO, and the remaining entries are advanced so that if a subsequent event command is encountered it is located in the head of the FIFO.

The popped coprocessor instructions are forwarded to the coprocessor for execution. Typically, execution by the coprocessor of these popped instructions causes the coprocessor to obtain input data of the type and in the order that is known to be required by the helper thread of the coprocessor. In embodiments, the coprocessor instructions can be data transfer commands, for example between shared DRAM and the coprocessor, and/or synchronization commands between the host and coprocessor. After executing the popped coprocessor instructions that are received from the FIFO, the coprocessor typically proceeds to execute applicable commands that are included in the helper thread assigned to the coprocessor. For example, the popped instructions from the FIFO may direct the coprocessor to exchange data with shared DRAM, after which the newly received data is encoded or otherwise processed by the coprocessor, as directed by its helper thread.

While it is executing the popped instructions and helper thread commands, the coprocessor sequencer clears its current event register or writes some other registry entry to the current event register that does not correspond to or "agree with" any event command entries in the FIFO, so that additional coprocessor instructions are not popped from the FIFO until the coprocessor is ready for them. Once the coprocessor has executed all of the popped instructions received from the FIFO, and has performed any and all processing steps as directed by its helper thread, the coprocessor writes an event command to its current event register indicating that it is ready to receive further popped commands from the FIFO. In embodiments, the coprocessor also transmits a "done" message to the host processor, which allows the host processor to monitor the progress of the coprocessor in executing the instructions that it previously wrote to the FIFO. When an expected number of "done" commands is received by the host processor, it can, for example, exchange additional data between the DRAM and associated input and output channels, and then write a new string of entries to the FIFO.

In embodiments, the host processor and the one or more coprocessors are interconnected via a ring-type bus, such as the bus architecture disclosed in U.S. Pat. No. 8,181,003 (incorporated herein by reference in its entirety for all purposes), for which the present inventors are co-inventors. In some of these embodiments, the bus includes a bus controller, which can be implemented as a finite state machine (FSM) in hardware and/or software. In embodiments, the bus controller is responsible for comparing the contents of the FIFO header(s) and coprocessor current event register(s), for popping coprocessor instructions from the FIFO(s), and for transmitting the popped coprocessor instructions to the coprocessor(s) for execution.

Embodiments include additional FIFOs, wherein the FIFO described above can be referred to as the "scheduled" FIFO, and the additional FIFOs can include, for example, one or more host read FIFOs, host write FIFOs, and/or coprocessor write FIFOs. In various embodiments, the host read FIFO(s) can be used by the host to read registers of the coprocessor(s), the host write FIFO(s) can be used by the host to write to coprocessor registers, and/or the coprocessor write FIFO(s) can be used by the coprocessor(s) to write to the host without a "host read" command. In particular, in some embodiments the "done" messages can be sent by any of the coprocessors to the host via a coprocessor write FIFO.

The present invention is a method of synchronizing program executions of a host processor and of a coprocessor. The method includes the following steps:

A) dividing an application into a host portion and a helper portion;
B) implementing of the host portion on the host processor and implementing the helper portion on the coprocessor;
C) writing to a FIFO by the host processor of FIFO entries that include an event command followed by at least one coprocessor instruction, whereby the event command occupies a head of the FIFO;
D) comparing the event command in the FIFO head with a registry entry in a current event register of the coprocessor;
E) repeating step D) until the registry entry in the current event register agrees with the event command in the FIFO head;
F) popping the event command and the at least one coprocessor instruction from the FIFO and forwarding the popped at least one coprocessor instruction to the coprocessor, said popping being continued until all of the FIFO entries have been popped, or until a FIFO entry is encountered that is a subsequent event command;
G) writing by the coprocessor to the current event register of an entry that does not agree with any remaining FIFO entry event commands;
H) executing by the coprocessor of the helper portion of the application;
I) transmitting by the coprocessor to the host processor of a message indicating that execution of the helper portion has been completed; and
J) writing by the coprocessor to the current event register of an event command registry entry.

In embodiments, the FIFO and the coprocessor are linked by a bus having a bus controller, and wherein steps D), E), and F) are executed by the bus controller. In some of these embodiments, the bus has a ring architecture.

In any of the above embodiments, the registry entry in the current event register can be deemed to agree with the event command in the FIFO head if it is identical with the event command in the FIFO head.

Any of the above embodiments can further include a coprocessor memory as part of the coprocessor and a shared memory that is accessible to the coprocessor, and wherein the at least one popped coprocessor instruction includes an instruction directing the coprocessor to read data from the shared memory into the coprocessor memory. In some of these embodiments, the at least one popped coprocessor instruction includes a command directing the coprocessor to exchange data with the shared memory. In any of these embodiments, the shared memory can be accessible to the host processor, and the host portion of the application can include commands directing the host processor to exchange data between the shared memory and at least one input and/or output channel.

In any of the above embodiments, the at least one popped coprocessor instruction can include at least one of a data flow command and a synchronization command.

In any of the above embodiments, in step C) the FIFO entries written by the host to the FIFO can include a plurality of entry groups, each entry group comprising an event command followed by at least one coprocessor instruction. In some of these embodiments, step F) further includes advancing the FIFO entries in the FIFO so that when a FIFO entry is encountered that is a subsequent event command, the subsequent event command occupies the head of the FIFO.

Any of the above embodiments can further include reading by the host processor of the event command in the FIFO head and writing by the host processor of the event command to the current event register of the coprocessor.

In any of the above embodiments, the helper portion can be free of any interactive inputs and can have an input order that is strictly defined.

In any of the above embodiments, the host portion can be subject to timing that is not predetermined. In some of these embodiments, the host portion is subject to interactive timing that is not predetermined, In any of the above embodiments, the application can be a pipelined multi-batch execution program.

In any of the above embodiments, the message indicating that execution of the helper portion has been completed can be transmitted by the coprocessor to the host processor via a coprocessor write FIFO.

And any of the above embodiments can further include at least one of reading by the host of a register of the coprocessor via a host read FIFO, writing by the host to a register of the coprocessor via a host write FIFO, and writing by the coprocessor to the host via a coprocessor write FIFO.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
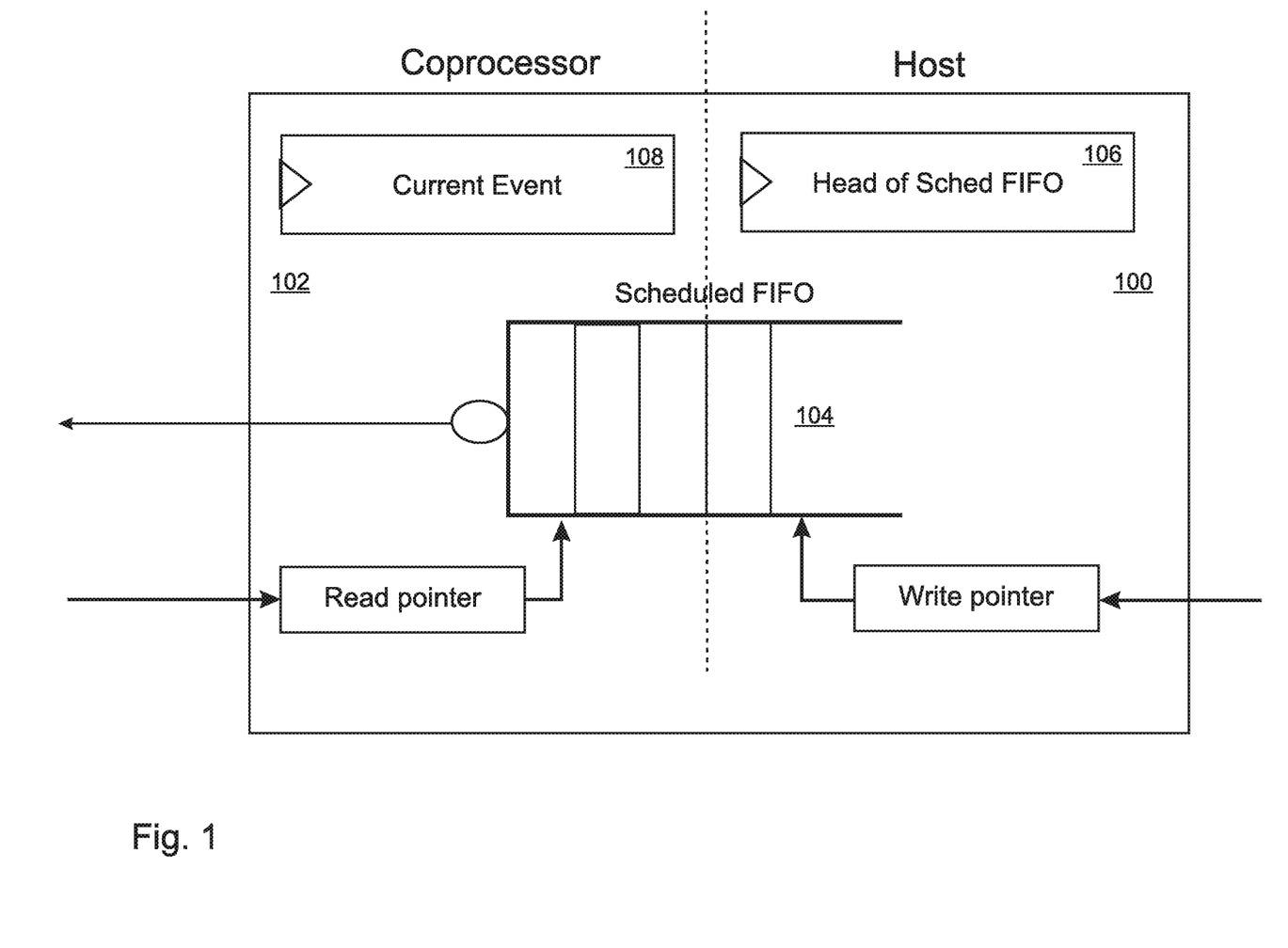
FIG. 1 is a block diagram illustrating an embodiment of the present invention that includes a single coprocessor and FIFO.

With reference to FIG. 1, the present invention is a method of synchronizing and coordinating the program executions of a host processor 100 and one or more coprocessors 102 without dependence on interrupts, and while avoiding the execution speed penalty of an MPI implementation. The invention achieves these goals by implementing at least one FIFO 104 that can store "event" commands as well as coprocessor instructions such as data flow and synchronization instructions. According to the disclosed method, the host processor 100 writes a series of entries to the FIFO 104 that begins with an "event" command stored in the "head" 106 of the FIFO 104. In addition, each of the coprocessors 102 maintains a "current event" register 108 where the coprocessor 102 stores an event command when it is ready to receive new input.

Figure 2:
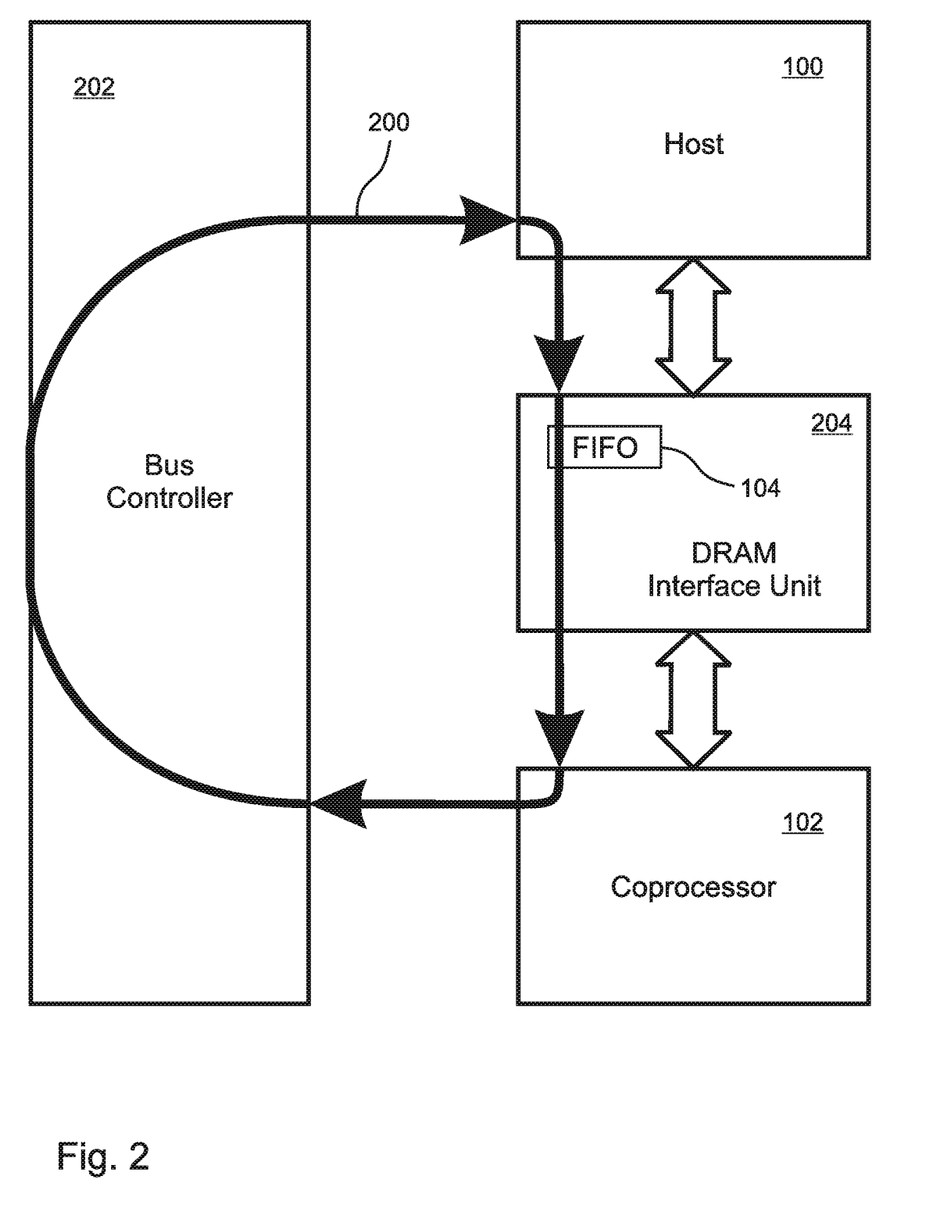
FIG. 2 is a block diagram of an embodiment of the present invention that implements communication between the host, DRAM, and a coprocessor using a ring-bus and bus controller.

With reference to FIG. 2, in embodiments the host processor and all of the coprocessors are interconnected via a ring-type bus 200, such as the bus architecture disclosed in U.S. Pat. No. 8,181,003 (incorporated herein by reference in its entirety for all purposes), for which the present inventors are co-inventors. In some of these embodiments, the bus 200 includes a bus controller 202, which can be implemented as a finite state machine (FSM) in hardware and/or software. In embodiments, the bus controller 202 is responsible for comparing the contents of the FIFO header(s) 106 and coprocessor current event register(s) 108, for popping coprocessor instructions from the FIFO(s) 104, and for transmitting the coprocessor instructions from the FIFO(s) 104 to the coprocessor(s) 102 for execution. In the illustrated embodiment, the FIFO 104 is implemented in a DRAM interface unit 204 that is accessible to both the host 100 and the coprocessor 102.

Figure 3:
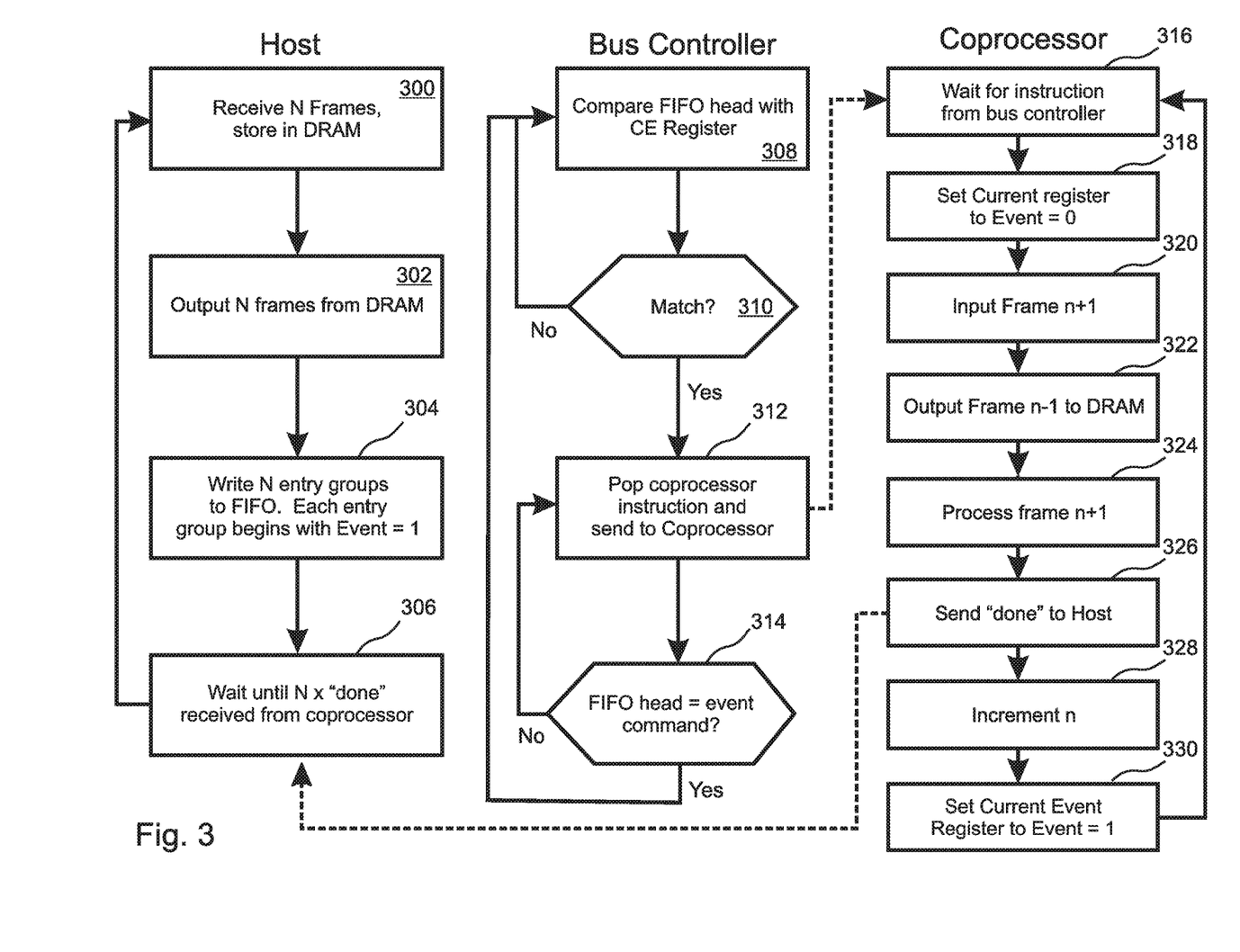
FIG. 3 is a flow diagram illustrating the operation and interactions between a host, bus controller, and coprocessor in an embodiment of the present invention.

FIG. 3 is a flow diagram that illustrates an embodiment of the present method wherein the program executions of a host 100 and coprocessor 102 are synchronized by a FIFO 104 and bus controller 202 so as to process a plurality of data frames, as might be the case for a voice encoding application. According to the illustrated example, the host 100 receives N frames of digitized voice data 300 from an input channel and stores them in DRAM 204 that is accessible to both the host 100 and coprocessor 102. In addition, the host 100 outputs N frames of processed voice data 302 from the DRAM 204 to an output channel. Since there are now N frames of input data in DRAM that are ready to be encoded or otherwise processed, the host 100 then writes N sequential groups of entries 304 to the FIFO 104, where each entry group begins with an event command "Event=1." The entry groups are essentially identical, in that each entry group includes coprocessor instructions that direct the coprocessor to input a frame of input data from the DRAM 204 into internal memory of the coprocessor, encode or otherwise process the data, and then write the processed data back to the DRAM 204 as output data. At this point the host 100 proceeds with other tasks, or simply waits 306 to receive N×"done" messages from the coprocessor 102, which will indicate that all of the N frames of input data have been processed by the coprocessor 102.

Note that in various embodiments the host 100 is able to write event commands to the current event register 108 of the coprocessor 102, for example to force the popping of entries when handling error conditions. Meanwhile the bus controller 202 continuously or pseudo continuously compares 308 the head of the FIFO 106 with the contents of the coprocessor current event register 108 to determine if they are equal to each other 310, or otherwise "agree" with each other, where agreement can be any defined relationship between the two entries. When the event command stored in the current event register 108 of the coprocessor 102 is found to be equal to, or otherwise agree with, the event command stored as the head entry 106 of its associated FIFO, the event command and coprocessor instructions that immediately follow the event command in the FIFO are "popped" 312 from the FIFO 104 until the next event command is encountered 314, or until the last entry written to the FIFO 104 has been popped. The popped coprocessor instructions are transmitted to the coprocessor for execution. In embodiments, the FIFO entries are cleared as they are popped from the FIFO 104, and the remaining FIFO entries are advanced, so that if a subsequent event command is encountered and the popping process is halted, the subsequent event command occupies the head 106 of the FIFO 104.

The presence of an event command such as "Event=1" in the current event register 108 at the time it is matched 310 with the head entry 108 of the FIFO 104 indicates that the coprocessor 102 is ready and waiting for instructions 316 from the bus controller 202. Upon receiving the popped coprocessor instructions, the coprocessor 102 writes 318 "Event=0" or some other entry to the current event register 108 that will not match any of the event command entries in the FIFO 100, so as to indicate that the coprocessor 102 is busy and is not prepared to receive any further coprocessor instructions from the FIFO 104.

In the illustrated example, the popped coprocessor instructions direct the coprocessor 102 to read an input data frame 320 from DRAM 204 to location n+1 of the coprocessor internal memory, and to output a processed data frame 322 from location n−1 to the DRAM 204. The coprocessor 102 also proceeds to encode or otherwise process the input data frame 322 at location n+1 according to code that is included in the helper thread that is assigned to the coprocessor 102. Once processing of the data frame is complete, the coprocessor 102 sends a "done" message 326 to the host 100, increments 328 the value of n, and sets the current event register 330 back to Event=1, thereby indicating that it is ready to receive more popped instructions from the FIFO 104.

When an expected number of "done" messages is received 306 by the host processor 100, it can, for example, read 300 and write 302 additional data to and from the DRAM 204, and then write a new string of entries 304 to the FIFO 102.

Figure 4:
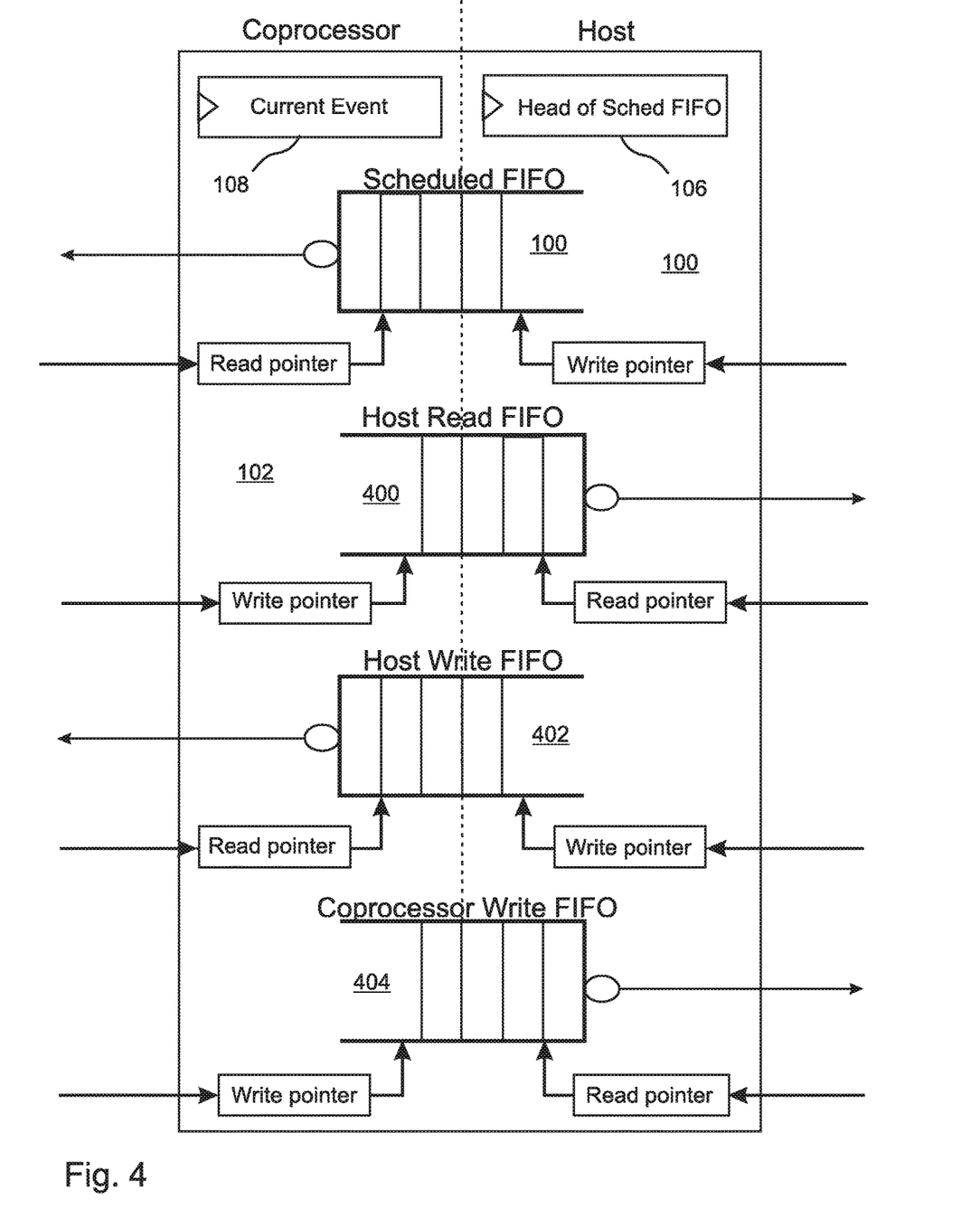
FIG. 4 is a block diagram illustrating an embodiment of the present invention that includes a plurality of FIFOs.

With reference to FIG. 4, embodiments include additional FIFOs 402-404, wherein the FIFO 100 described above can be referred to as the "scheduled" FIFO 100, and the additional FIFOs can include, for example, one or more host read FIFOs 400, host write FIFOs 402, and/or coprocessor write FIFOs 404. In various embodiments, the host read FIFO(s) 400 can be used by the host 100 to read registers of the coprocessor(s) 102, the host write FIFO(s) 402 can be used by the host 100 to write to coprocessor registers, and/or the coprocessor write FIFO(s) 404 can be used by the coprocessor 102 to write to the host 100 without a "host read" command. In some embodiments, the "done" messages can be sent 326 by any of the coprocessors 102 to the host 100 via a coprocessor write FIFO 404.

Figure 5A:
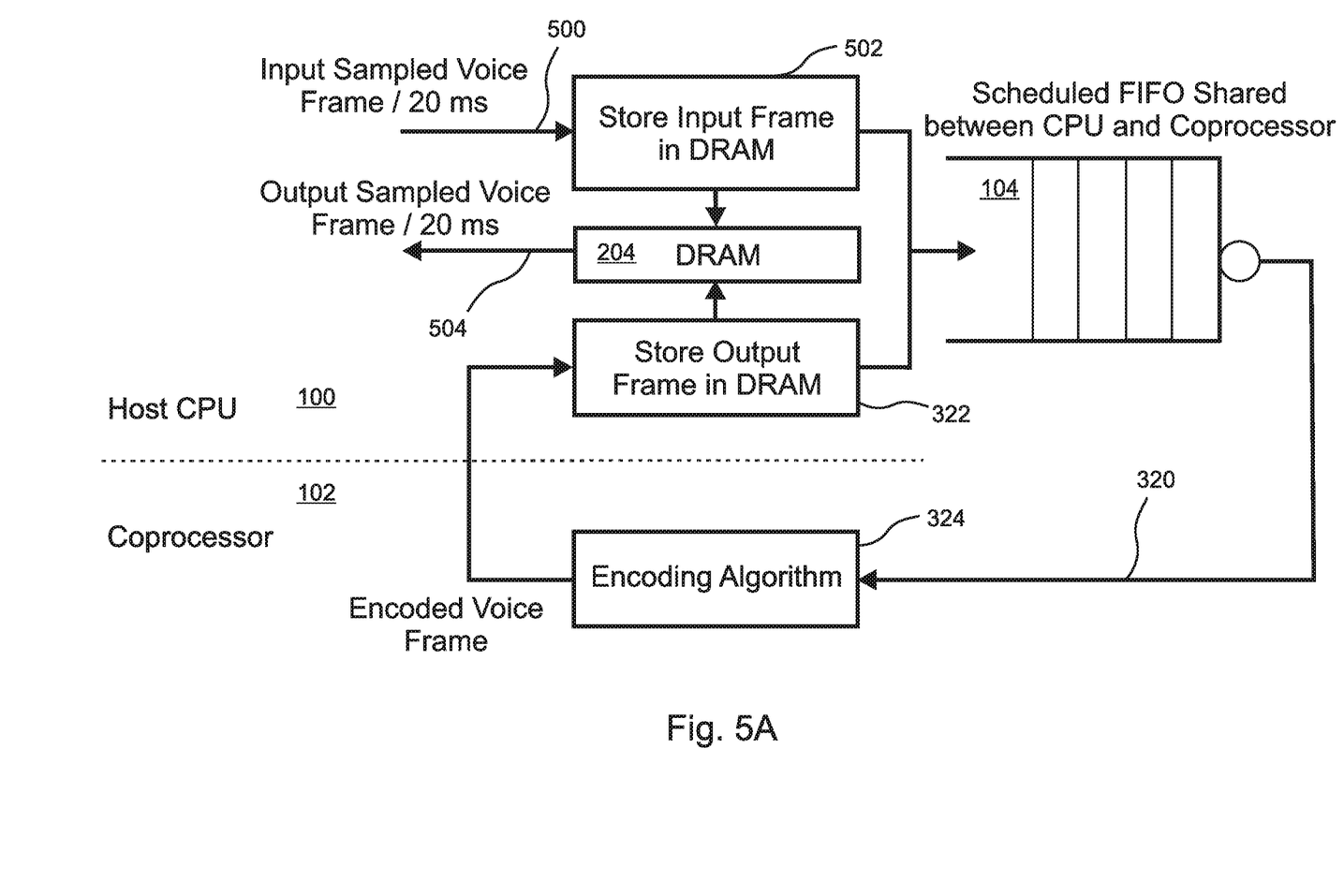
FIG. 5A is a block diagram that illustrates the embodiment of FIG. 4.

FIG. 5A is a simplified block diagram that illustrates the method of FIG. 4 as implemented in a voice encoding application. In the illustrated example, the voice data frames are received 500 from an input channel at a rate of one frame every 20 ms, and are stored 502 in DRAM 204. Each frame is considered a "batch," whereby a pipeline multi-batch execution process is applied to a plurality of input frames received from a single input channel. As discussed above, the host 100 is responsible for receiving 300, 500 the input frames from an input channel and storing them 502 in DRAM 204, and for outputting data frames 302, 504 from DRAM 204 to an output channel after they have been encoded by the coprocessor 102.

Figure 5B:
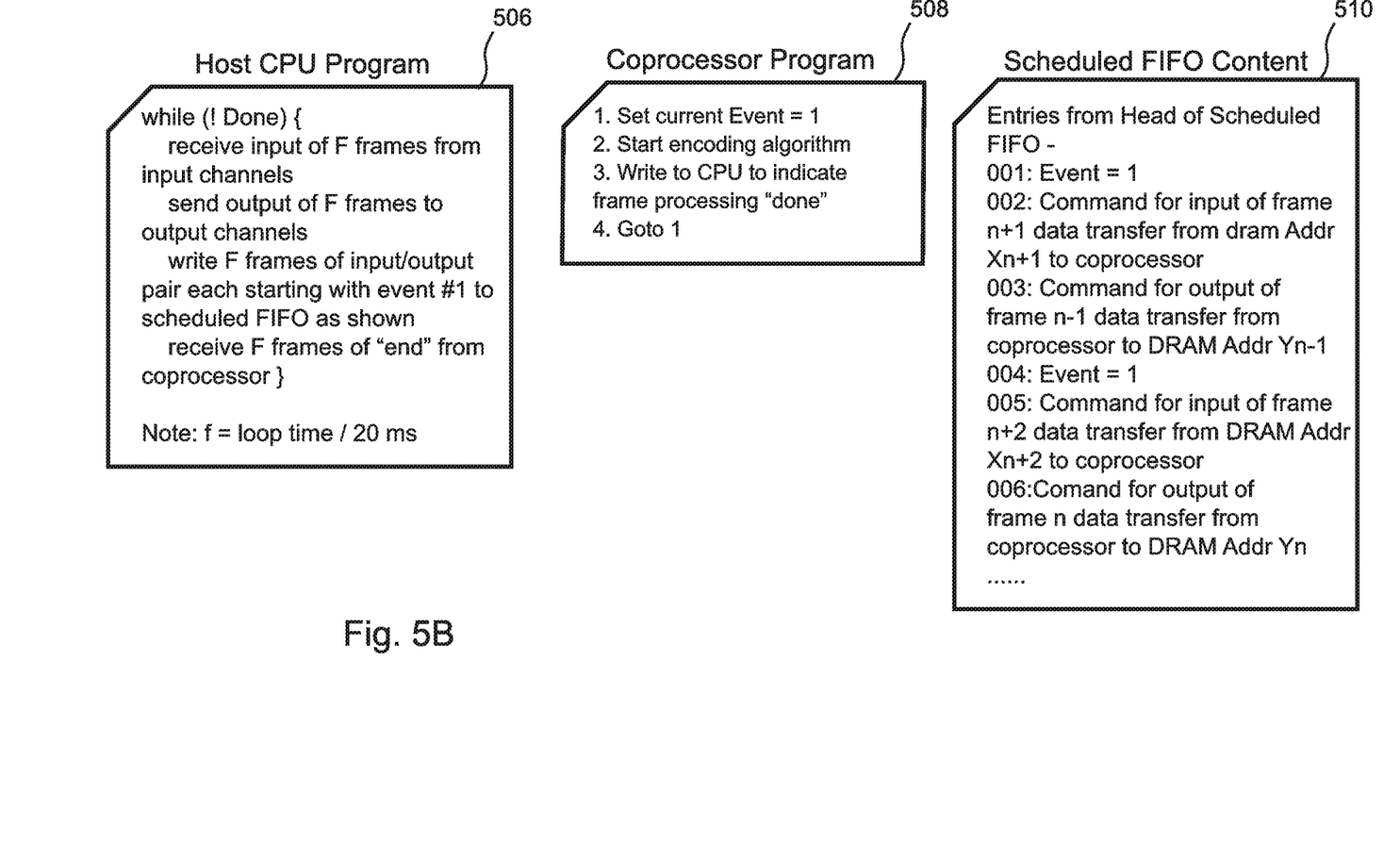
FIG. 5B illustrates the steps executed by the host and coprocessor and the entries written to the FIFO in the embodiment of FIG. 5A.

FIG. 5B illustrates the code 506 that is executed by the host 100 and the code 508 that is executed by the coprocessor 102, as well as the entries 510 that are written to the FIFO 104 by the host 100 before they are popped by the bus controller 202 in the embodiment of FIG. 5A.

Note that the batch rate for the illustrated example is the loop time divided by the frame time. For example, if the loop time is 100 ms and the frames are received at a rate of 20 ms per frame, then for each loop, the host 100 will be able to receive and process 100/20=5 frames of voice data, and each string of entries that is written by the host 100 to the FIFO 104 will include five batches of entries, each beginning with an event command and followed by data read/write instructions to be executed by the coprocessor 102.

Accordingly, in the illustrated example, the host 100 and coprocessor 102 are able to operate separately and independently from each other, including writing to and reading from the DRAM 204, because the events and associated coprocessor commands that are stored in the FIFO 104 serve to ensure that there are no read-after-write or other synchronization errors, or other problems. As such, no interrupts are required, and no added protocol is needed for synchronization and data transfer.

In the illustrated embodiment, the event commands are used essentially as "ready" flags. In other embodiments, a plurality of different types of event commands can be implemented, for example "Event=1," "Event=2," etc. This can be helpful if, for example, the coprocessor requires input from the FIFO at different stages of data processing, and/or for identifying and handling error conditions.

In a multi-core processor environment, the memory requirement, and thus the power consumption, of a pipelined multi-batch execution can be further reduced by distributing the "helper" data processing among a plurality of sub-functions or helper "threads," each having a similar time of execution, where each of the sub-functions is assigned to a separate coprocessor core. According to this approach, each of the coprocessor cores is only required to contain the code for a single one of the sub-functions.

If, for example, there are n cores, then the total "helper" processing time is reduced by 1/n as compared to an implementation with only one core, such as in the previous example. Accordingly, the clock rate required for multi-core embodiments is much slower than for single core embodiments, and also the power consumption can be greatly reduced. Or, if the clock rate is maintained, then multi-core embodiments can perform encoding or other data processing for a larger number of channels at a given rate as compared to single-core embodiments.

It should be noted, however, that in multi-core embodiments data flow is sometimes required between the sub-functions, i.e. between the cores, as well as input and output data flow between shared DRAM and the cores, which causes the networking requirements for some multi-core embodiments to be much more complex than for single-core embodiments. The networking structure describe in U.S. Pat. No. 8,811,387 (incorporated herein by reference in its entirety for all purposes) can be a good solution in some of these embodiments.

Figure 6A:
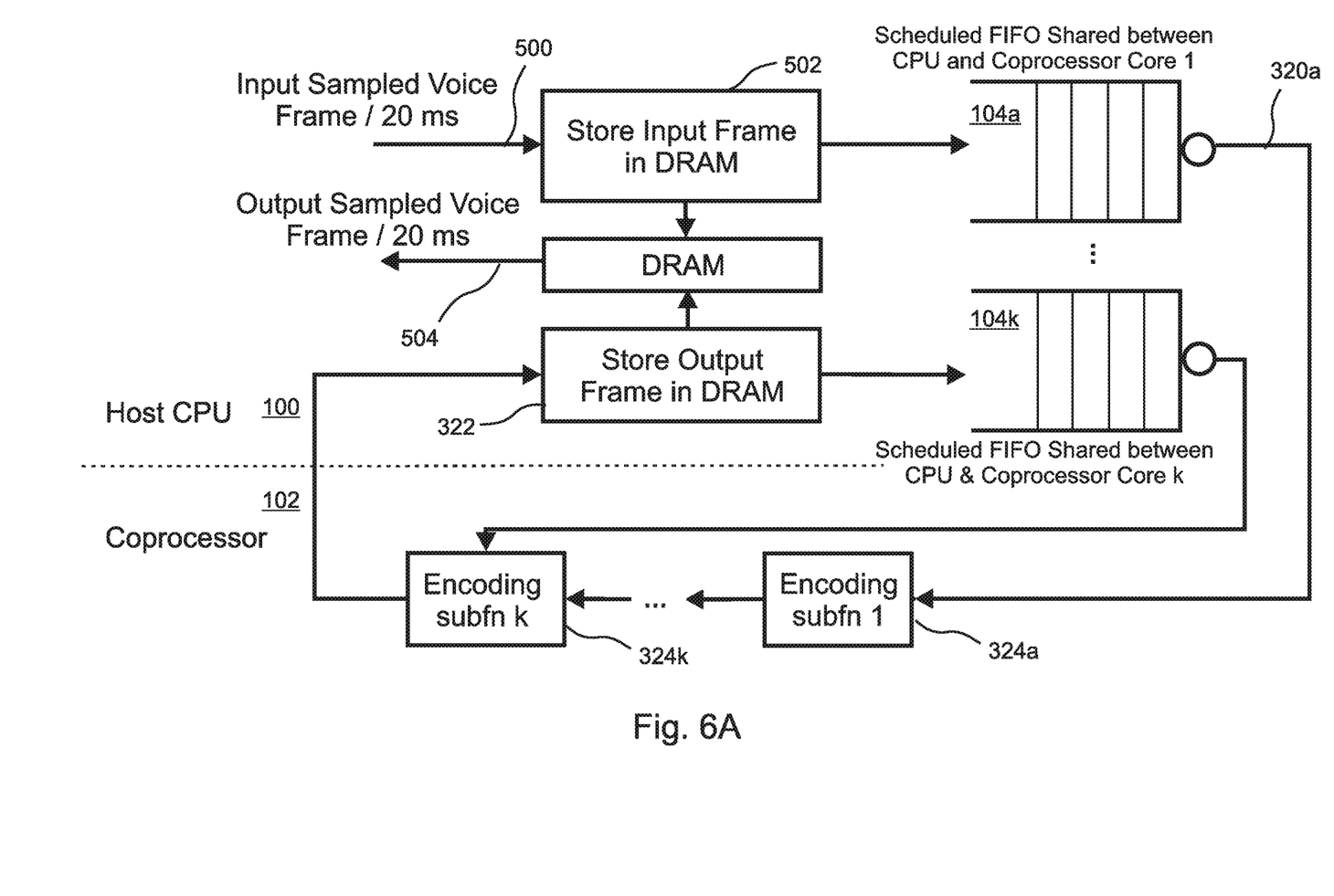
FIG. 6A is a block diagram similar to FIG. 5A but directed to an embodiment of the invention that includes a plurality of coprocessors and FIFOs.
Figure 6B:
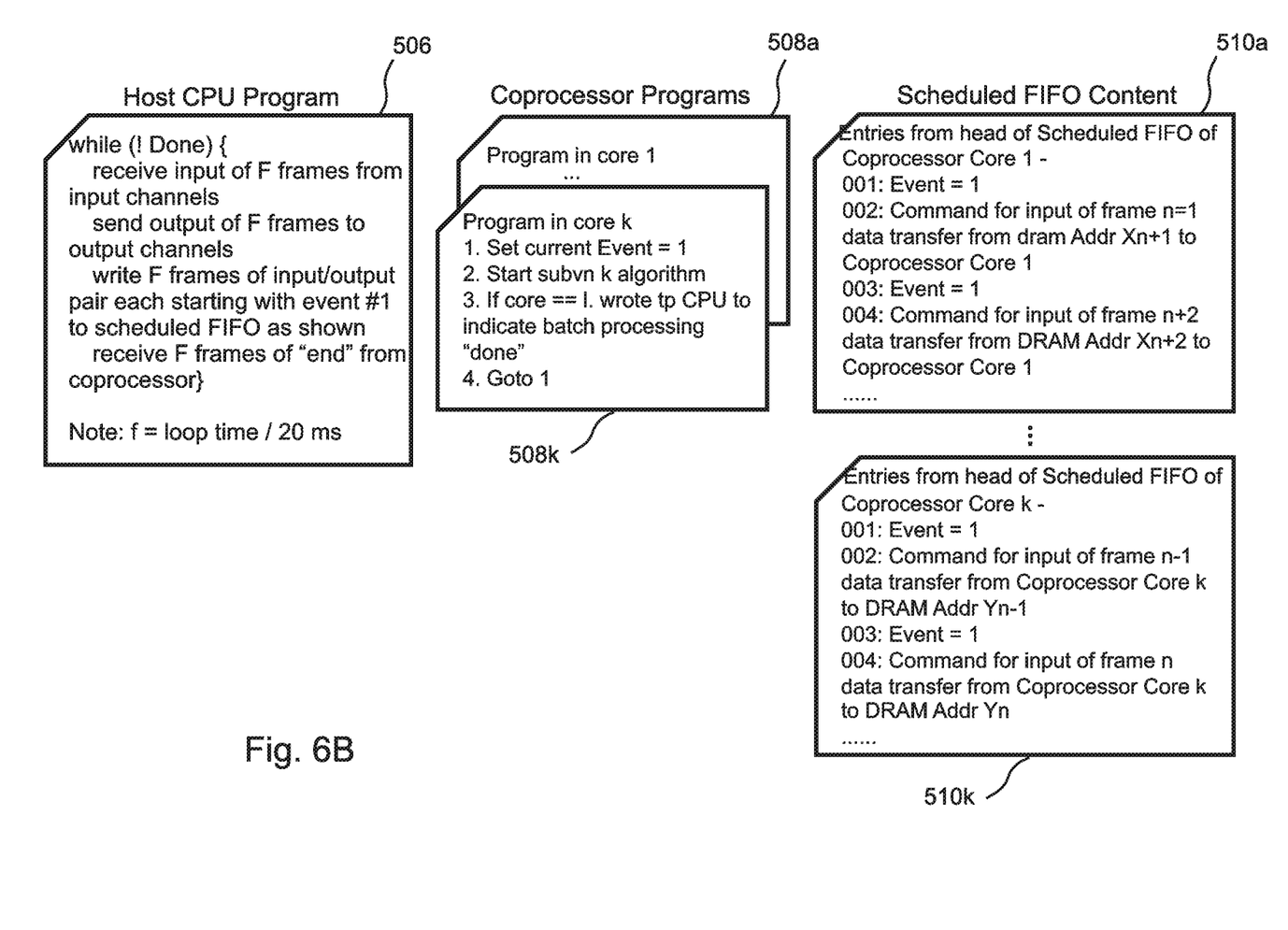
FIG. 6B illustrates the steps executed by the host and coprocessors and the entries written to the FIFOs in the embodiment of FIG. 6A.

FIG. 6A illustrates an embodiment of the present invention that includes a plurality of coprocessors 324*a-k* with a FIFO 104*a-k* dedicated to each of the coprocessors 324*a-k*, as can be applied for example to a partitioned voice encoder that implements pipelined multi-batch execution on a multi-core coprocessor. FIG. 6B illustrates the code 506 that is executed in the embodiment of FIG. 6A by the host 100 and the code 508*a-k* that is executed by the coprocessor 102, as well as the entries 510*a-k* that are written to the FIFOs 104*a-k* by the host 100 before they are popped by the bus controller 202.

Another example of an application that can be addressed by embodiments of the present invention is a deep learning inference application. These applications are similar to voice encoding applications, in that for voice and video inference the frame structure is similar to the frame structure for a voice encoding application that has a fixed rate of input. Often, the rate of input can be fixed for other inference programs as well. As such, the present invention can be implemented in at least three different ways using scheduled FIFOs 104 to provide the synchronization and data flow mechanism in a pipeline multi-batch execution:

- a single channel inference program using a single coprocessor;
- a multi-channel inference program using a plurality of coprocessors; or
- a single channel or multi-channel inference program for which the program is divided into sub-functions, and each of the sub-functions is assigned to a coprocessor core.

In embodiments, the current event register is accessible to the host. In some of these embodiments, the host is able, if necessary, to initiate execution by a coprocessor of its helper thread by reading the event command that is currently in the FIFO head and writing it to the current event register of the coprocessor.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A method of synchronizing program executions of a host processor and of a coprocessor, the method comprising: A) dividing an application into a host portion and a helper portion; B) implementing of the host portion on the host processor and implementing the helper portion on the coprocessor; C) writing to a FIFO(first in first out memory) by the host processor of FIFO entries that include an event command followed by at least one coprocessor instruction, whereby the event command occupies a head of the FIFO; D) comparing the event command in the FIFO head with a registry entry in a current event register of the coprocessor; E) repeating step D) until the registry entry in the current event register agrees with the event command in the FIFO head; F) popping the event command and the at least one coprocessor instruction from the FIFO and forwarding the popped at least one coprocessor instruction to the coprocessor, said popping being continued until all of the FIFO entries have been popped, or until a FIFO entry is encountered that is a subsequent event command; G) writing by the coprocessor to the current event register of an entry that does not agree with any remaining FIFO entry event commands; H) executing by the coprocessor of the helper portion of the application; I) transmitting by the coprocessor to the host processor of a message indicating that execution of the helper portion has been completed; and J) writing by the coprocessor to the current event register of an event command registry entry.

2. The method of claim 1, wherein the FIFO and the coprocessor are linked by a bus having a bus controller, and wherein steps D), E), and F) are executed by the bus controller.

3. The method of claim 2, wherein the bus has a ring architecture.

4. The method of claim 1, wherein the registry entry in the current event register is deemed to agree with the event command in the FIFO head if it is identical with the event command in the FIFO head.

5. The method of claim 1, further comprising a coprocessor memory included in the coprocessor and a shared memory that is accessible to the coprocessor, and wherein the at least one popped coprocessor instruction includes an instruction directing the coprocessor to read data from the shared memory into the coprocessor memory.

6. The method of claim 5, wherein the at least one popped coprocessor instruction includes a command directing the coprocessor to exchange data with the shared memory.

7. The method of claim 5, wherein the shared memory is accessible to the host processor, and wherein the host portion of the application includes commands directing the host processor to exchange data between the shared memory and at least one input and/or output channel.

8. The method of claim 1, wherein the at least one popped coprocessor instruction includes at least one of a data flow command and a synchronization command.

9. The method of claim 1, wherein in step C) the FIFO entries written by the host to the FIFO include a plurality of entry groups, each entry group comprising an event command followed by at least one coprocessor instruction.

10. The method of claim 9, wherein step F) further includes advancing the FIFO entries in the FIFO so that when a FIFO entry is encountered that is a subsequent event command, the subsequent event command occupies the head of the FIFO.

11. The method of claim 1, further comprising reading by the host processor of the event command in the FIFO head and writing by the host processor of the event command to the current event register of the coprocessor.

12. The method of claim 1, wherein the helper portion does not have any interactive inputs and has an input order that is strictly defined.

13. The method of claim 1, wherein the host portion is subject to timing that is not predetermined.

14. The method of claim 13, wherein the host portion is subject to interactive timing that is not predetermined.

15. The method of claim 1, wherein the application is a pipelined multi-batch execution program.

16. The method of claim 1, wherein the message indicating that execution of the helper portion has been completed is transmitted by the coprocessor to the host processor via a coprocessor write FIFO.

17. The method of claim 1, further comprising at least one of:
   reading by the host of a register of the coprocessor via a host read FIFO;
   writing by the host to a register of the coprocessor via a host write FIFO; and
   writing by the coprocessor to the host via a coprocessor write FIFO.

* * * * *